(12) United States Patent
Hooke et al.

(10) Patent No.: US 9,102,204 B1
(45) Date of Patent: Aug. 11, 2015

(54) HITCH-MOUNTED MORTAR MUNITION SYSTEM

(71) Applicants: Ryan Hooke, Sparta, NJ (US); John Labar, Bangor, PA (US)

(72) Inventors: Ryan Hooke, Sparta, NJ (US); John Labar, Bangor, PA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/948,520

(22) Filed: Jul. 23, 2013

(51) Int. Cl.
B60R 19/54 (2006.01)
B60D 1/58 (2006.01)

(52) U.S. Cl.
CPC .......................... B60D 1/58 (2013.01)

(58) Field of Classification Search
USPC .......................... 280/506, 386, 483–486, 656
See application file for complete search history.

(56) References Cited

U.S. PATENT DOCUMENTS 3,003,399 A * 10/1961 Donner .................. 89/37.13
6,834,879 B1 * 12/2004 Lorman .................. 280/506

* cited by examiner

Primary Examiner — John Walters
Assistant Examiner — James Triggs
(74) Attorney, Agent, or Firm — Henry S. Goldfine

(57) ABSTRACT

A mortar mount adapter is configured to fit in a towing hitch system mounted on a land vehicle. The towing hitch system absorbs and disperses recoil force from the mortar. The adapter is disposed in one of a trailer hitch receiver, a gooseneck hitch socket, and a fifth wheel hitch. The adapter includes a socket for the ball of a mortar tube and a shank extending from the socket wherein the socket and the shank are symmetrical about the central longitudinal axis of the adapter.

13 Claims, 12 Drawing Sheets

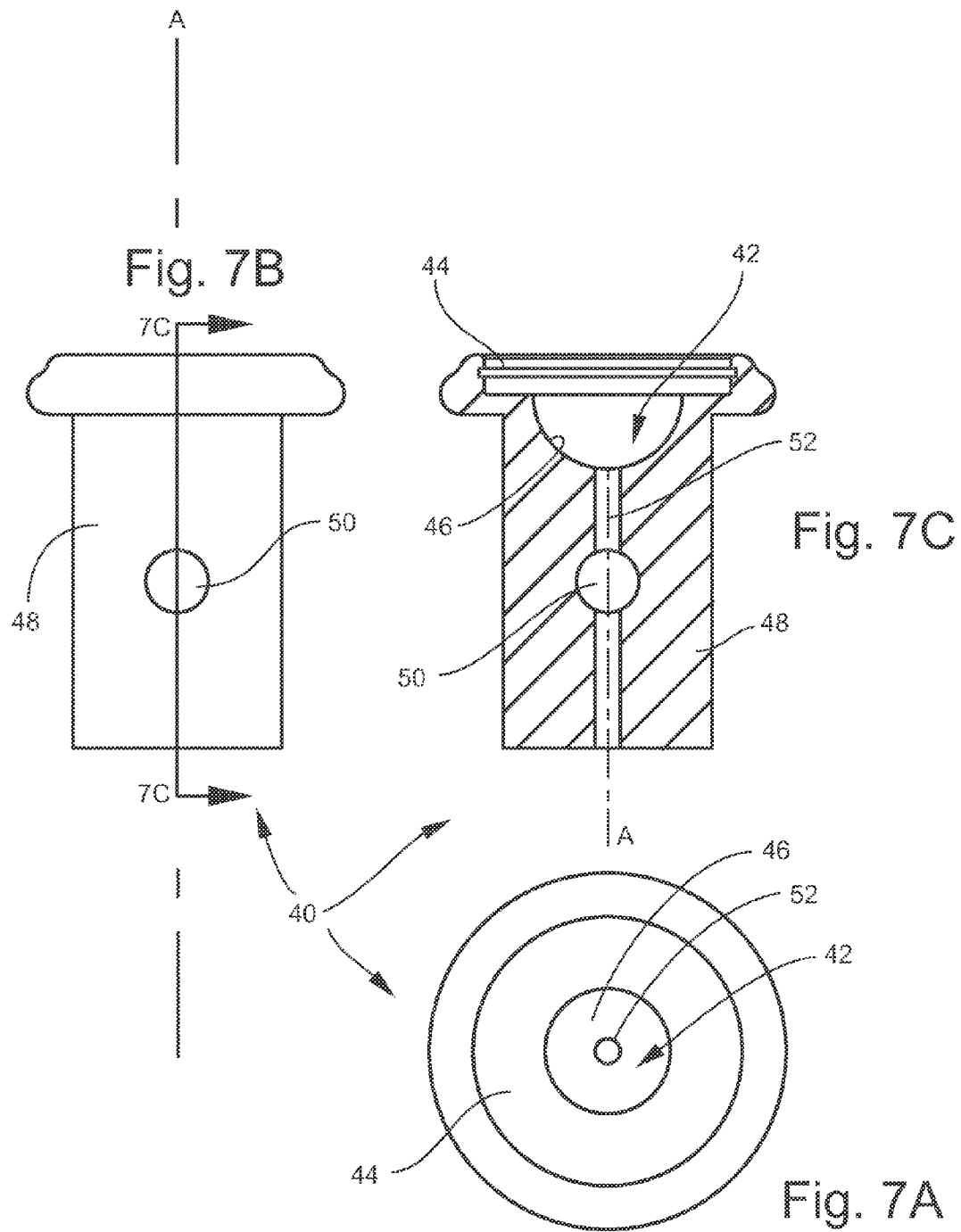

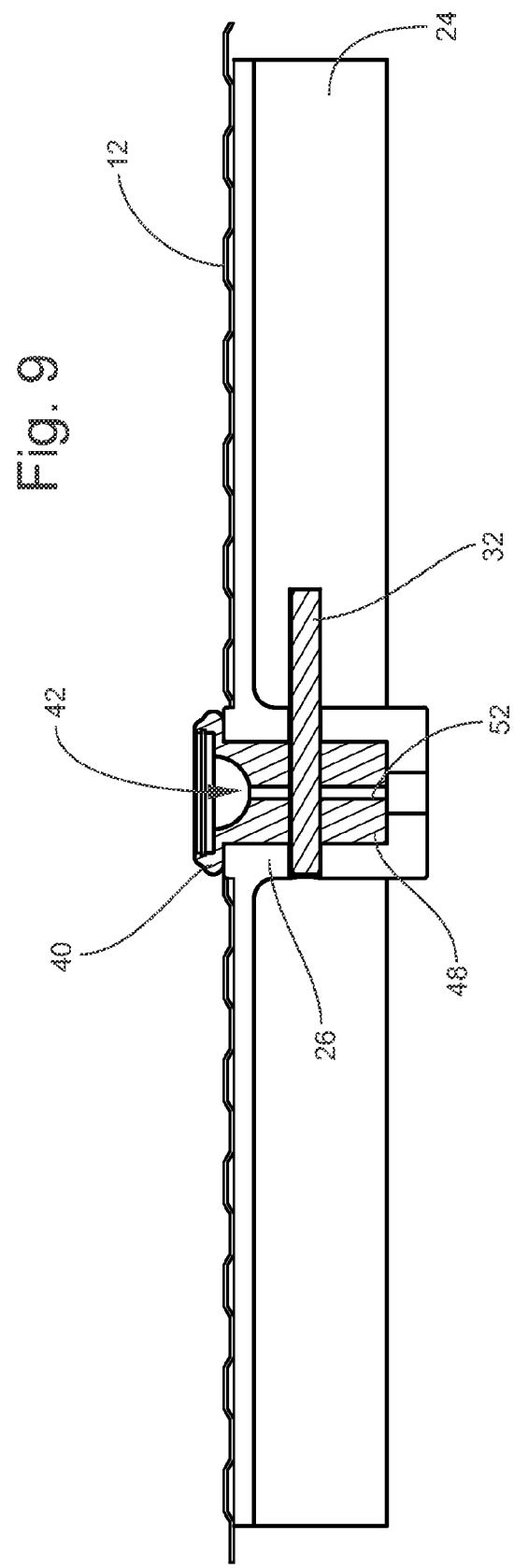

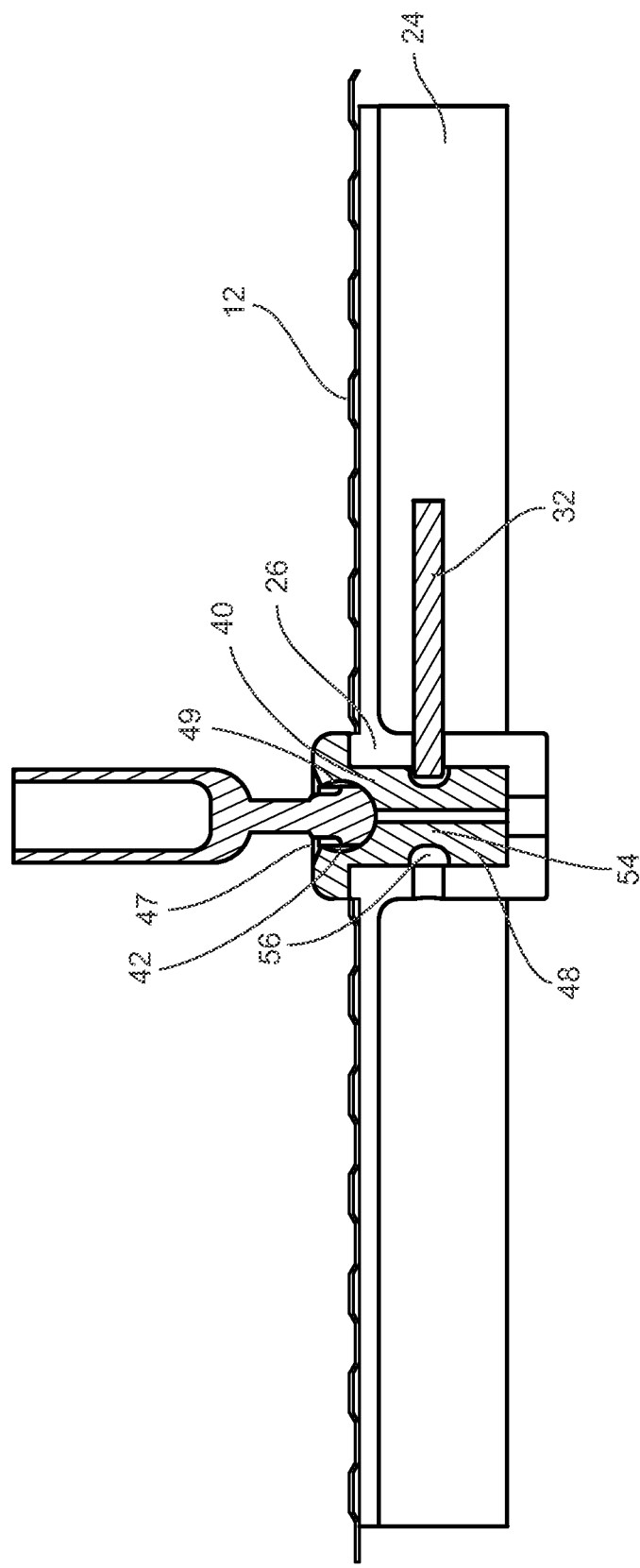

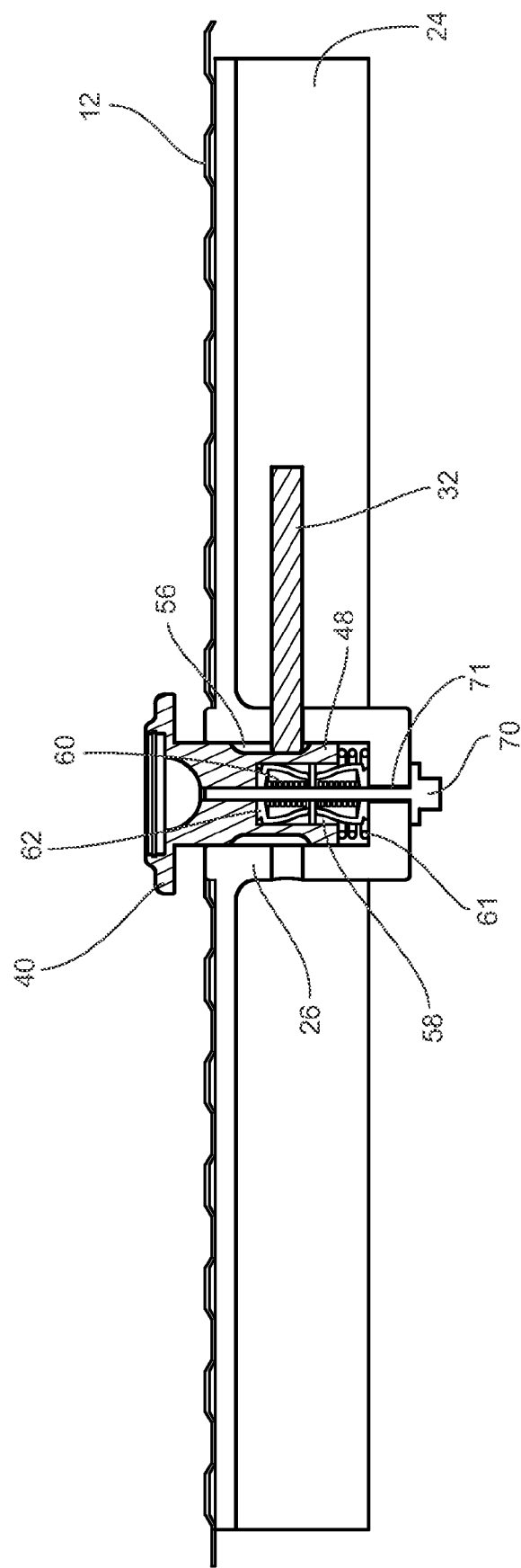

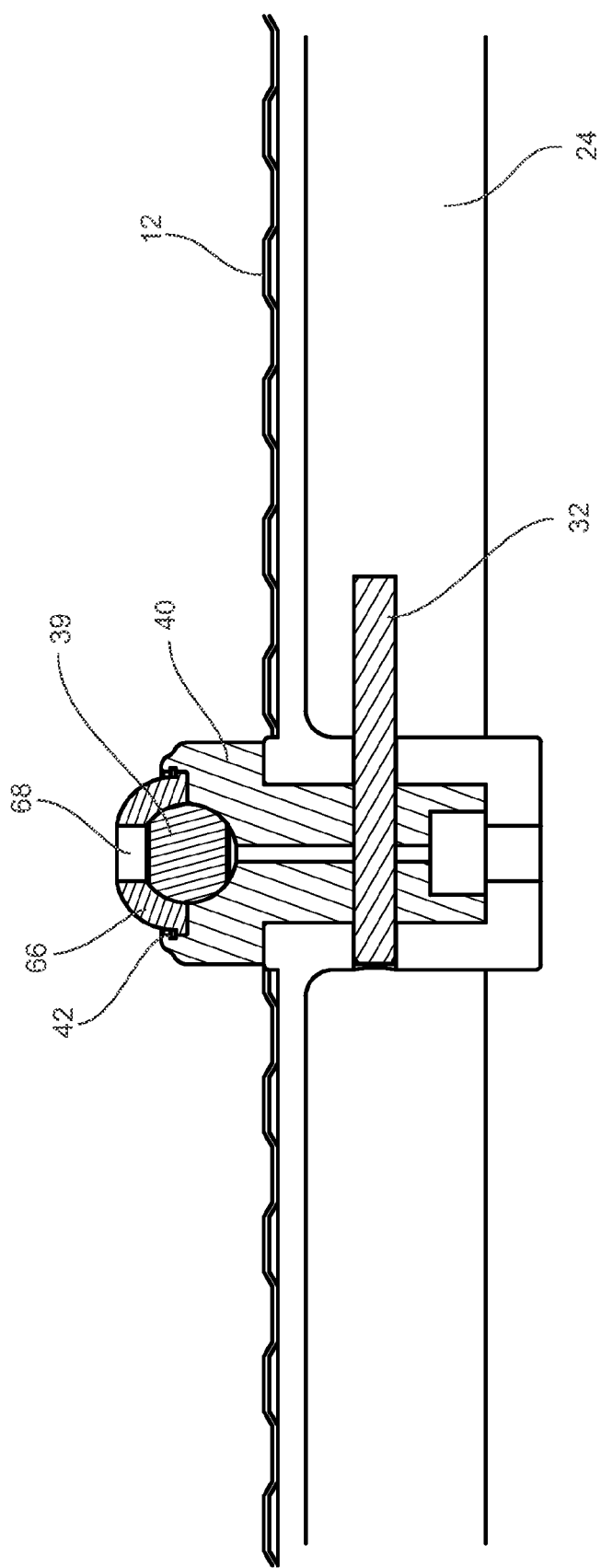

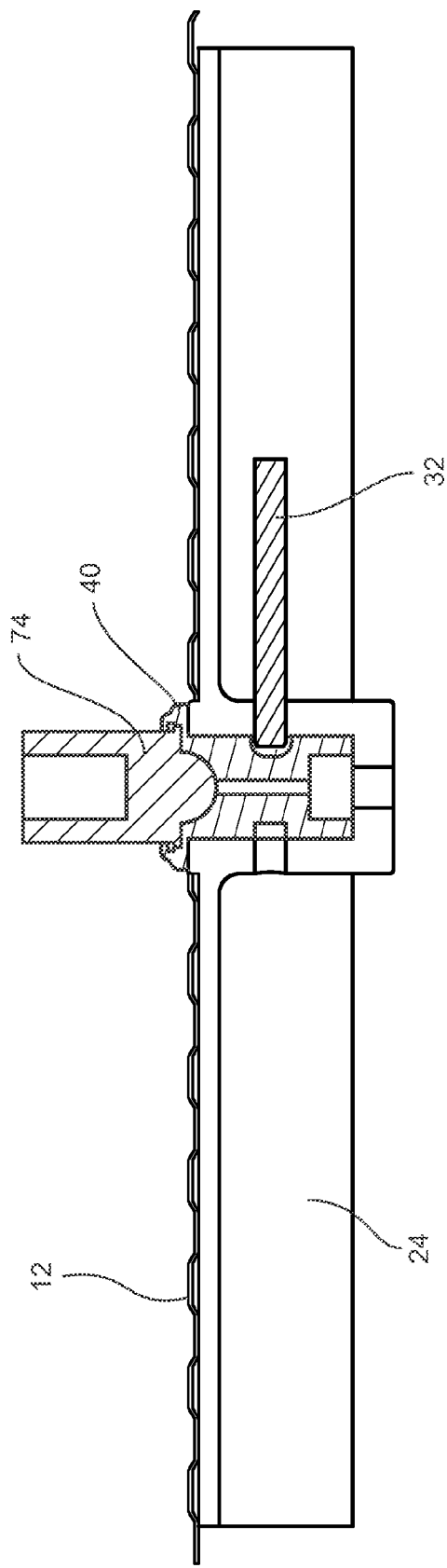

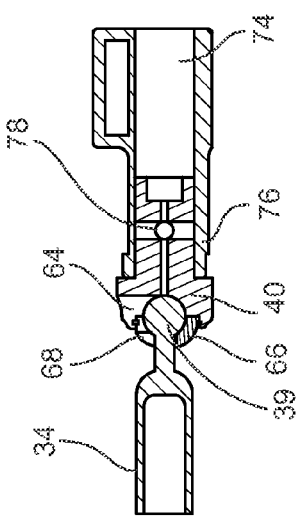
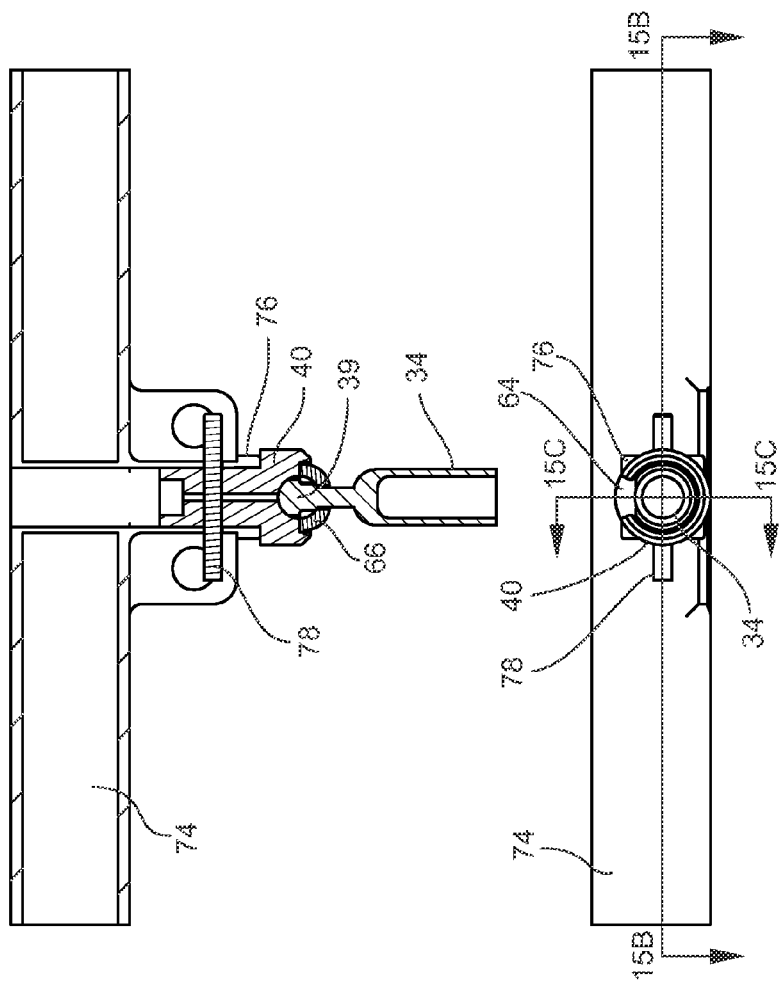

HITCH-MOUNTED MORTAR MUNITION SYSTEM

STATEMENT OF GOVERNMENT INTEREST

The inventions described herein may be manufactured, used and licensed by or for the United States Government.

BACKGROUND OF THE INVENTION

The invention relates in general to mortar munition systems, and in particular to vehicle-mounted mortar munition systems.

Mortar munition systems have long been known in warfare. In general, a mortar system includes four basic components: the ammunition or projectile, a barrel or tube, a bipod that supports the tube, and a base plate that disperses the recoil force. The projectile is usually loaded into the muzzle of the tube. Firing the mortar includes using chemical combustion to propel the projectile out of the tube. Some mortars use a projectile with the propelling charge incorporated in the projectile. Other mortars use a propelling charge that is placed in the tube prior to inserting the projectile in the tube.

Recoil force is generated when a round, such as a projectile, is fired from the mortar tube. The base plate receives the recoil force from the tube and disperses the recoil force over an area. Dispersing the recoil force decreases the force per unit area. Recoil force dispersion is important for both mounted and dismounted mortar systems. If the base plate did not disperse the recoil force, an undesirable point loading would result. In a mounted system, point loading may destroy the vehicle to which the mortar is mounted, or may pierce or otherwise damage the vehicle. In a mounted system, if the recoil force is not dispersed, the recoil energy must be absorbed by a recoil system. In a dismounted system, point loading may eventually bury the mortar underground.

Mortar munition systems provide a range of capabilities including providing light at night, providing smoke screens for defense, and launching high explosive projectiles for offense. Mortar tubes are often shorter than artillery tubes. Advancements in technology have enabled mortar weapons to become more easily transportable, thereby allowing infantry to use less artillery. In some cases, a mortar, for example, a 60 mm mortar, may be fired from a multi-use land vehicle having a cargo bed. The multi-use land vehicle may not be a dedicated mortar firing platform, because it is used for purposes other than firing mortars. Thus, a permanently mounted mortar system is not desirable on such a vehicle. Examples of multi-use land vehicles are the High Mobility Multipurpose Wheeled Vehicle (HMMWV), jeeps, and pickup trucks.

To fire a mortar from a multi-use land vehicle's cargo bed, a standard mortar base plate has been used, along with sandbags or tires to help absorb the recoil force and minimize damage to the land vehicle's cargo bed. Problems with the use of sandbags and tires include, among others, their availability and weight and the lack of a stable firing platform. The lack of a stable firing platform is unsafe and greatly decreases the accuracy of the mortar projectiles.

A need exists for a mortar mount for a multi-use land vehicle that is easily installed or retrofitted, is stable and does not interfere with other uses of the land vehicle.

SUMMARY OF INVENTION

One aspect of the invention is a mortar mount adapter configured to fit in one of a trailer hitch receiver, a gooseneck hitch socket, and a king pin opening in a fifth wheel hitch. The adapter has a central longitudinal axis and a socket for a ball and socket joint in one end. A shank extends from the socket. The socket and the shank are symmetrical about the longitudinal axis. The socket is configured to receive a ball on a breech end of a mortar tube.

The shank may include at least one transverse through hole normal to the longitudinal axis. A longitudinal through hole may extend from a bottom of the socket to an end of the shank. The longitudinal through hole is centered around the longitudinal axis. The shank may include a reduced thickness portion that forms an exterior slot.

An end of the shank may include an opening formed therein. A spring and/or a damper may be disposed in the opening in series or in parallel.

A portion of the socket may be cut away to form a lateral opening for rotating a mortar tube to a horizontal position.

The socket end of the adapter may include a flange centered on the longitudinal axis. In one embodiment, the socket includes a counter bore and a spherical surface. In another embodiment, the socket includes a conical surface and a spherical surface.

Another aspect of the invention is a method that includes providing a mortar mount adapter and inserting the adapter into one of a trailer hitch receiver, a gooseneck hitch socket, and a king pin opening in a fifth wheel hitch.

The method may include inserting a ball of a breech of a mortar tube into the socket in the adapter. A round may be fired from the mortar tube.

A portion of the socket joint of the adapter may be cut away to form a lateral opening therein and the method may include firing a round from a mortar tube in a direct fire manner.

In one embodiment, the method may include inserting a pintle adapter into the mortar mount adapter.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 7A is a top view of one embodiment of a removable mortar mount adapter.

FIG. 7B is a side view of FIG. 7A.

FIG. 7C is a sectional view taken along the line 7C-7C of FIG. 7B.

FIG. 9 is a view similar to FIG. 8 with a removable mortar mount adapter disposed in the gooseneck socket.

FIG. 10 is a transverse sectional view through a cargo bed showing variations of a removable mortar mount adapter.

FIG. 11 is a transverse sectional view through a cargo bed showing further variations of a removable mortar mount adapter.

FIG. 12A is a transverse sectional view through a cargo bed showing a removable mortar mount adapter suitable for firing a mortar horizontally.

FIG. 13 is a transverse sectional view through a cargo bed showing a pintle adapter used with a removable mortar mount adapter.

FIG. 15A is an end view of a trailer hitch receiver with the adapter of FIGS. 12A and 12B inserted therein.

FIG. 15B is a sectional view taken along the line 15B-15B of FIG. 15A.

FIG. 15C is a sectional view taken along the line 15C-15C of FIG. 15A.

DETAILED DESCRIPTION

Novel apparatuses and methods for firing mortars from a land vehicle use known towing hitch systems. Towing hitch systems distribute the load of a towed vehicle over some or all of the towing vehicle. In the case of firing a mortar, the towing hitch system distributes the recoil force of the mortar over some or all of the land vehicle. A towing hitch system uses a towing hitch support that is rigidly fixed to the main frame of the towing vehicle. The main frame of the towing vehicle may include longitudinal and transverse members. Towing hitch systems are rigidly fixed in a known manner to the main frame of the vehicle using, for example, threaded fasteners, clamps, welding, brackets, etc.

In one embodiment of the invention, the towing hitch system is a trailer hitch receiver, also known as a "bumper pull" hitch. The trailer hitch receiver may be fixed to the front or rear of the vehicle frame. Class III-V trailer hitch receivers may be used.

In another embodiment of the invention, the towing hitch system is a gooseneck towing hitch system. Gooseneck towing hitch systems may be used with vehicles having a cargo bed or other suitable mounting means.

In another embodiment of the invention, the towing hitch system is a fifth wheel towing hitch system. Fifth wheel towing systems may be used with vehicles having a cargo bed or other suitable mounting means.

Trailer hitch receivers, gooseneck towing hitch systems, and fifth wheel towing hitch systems are all readily commercially available. For example, see www.etrailer.com for a list of manufacturers. These towing hitch systems may be retrofitted on land vehicles.

Figure 1:
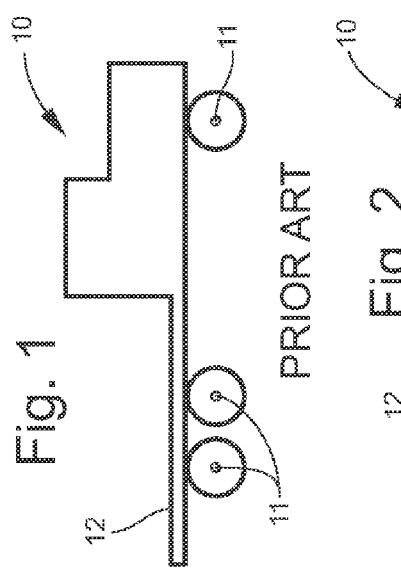
FIG. 1 is a schematic side view of a multi-use land vehicle.
Figure 2:
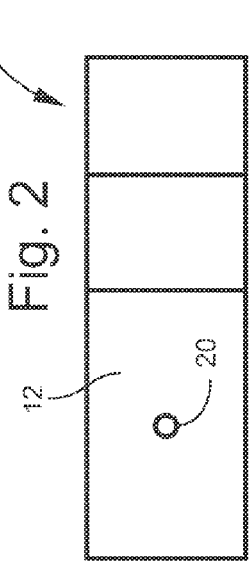
FIG. 2 is a top schematic view of a multi-use vehicle.
Figure 3:
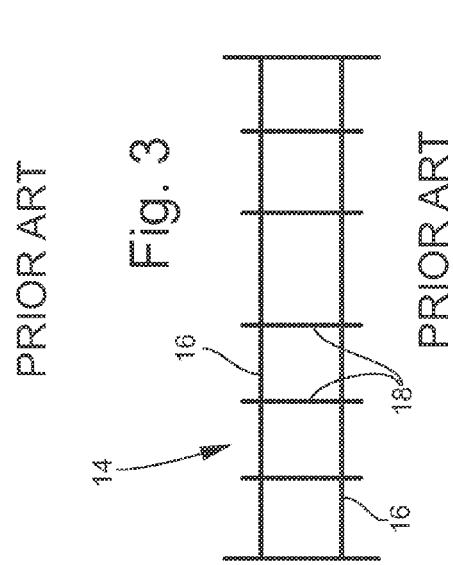
FIG. 3 is a schematic top view of the main frame of a vehicle.

FIG. 1 is a schematic side view of a multi-use land vehicle 10 having a cargo bed 12. Vehicle 10 may be wheeled and/or tracked and may have two or more axles 11. FIG. 2 is a top schematic view of vehicle 10 showing an opening 20 in cargo bed 12. FIG. 3 is a schematic top view of the main frame 14 of vehicle 10. Main frame 14 supports vehicle 10 and may include longitudinal members 16 and transverse members 18.

Figure 4:
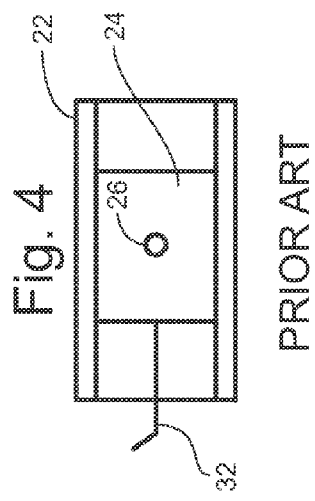
FIG. 4 is a top schematic view of a gooseneck towing hitch support.
Figure 5:
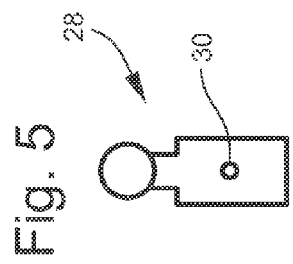
FIG. 5 is a side view of a gooseneck ball.

FIG. 4 is a top schematic view of a gooseneck towing hitch support 22. Towing hitch support 22 is rigidly fixed in a known manner to main frame 14 of vehicle 10, for example, under cargo bed 12. A gooseneck towing hitch 24 is fixed to towing hitch support 22. Gooseneck towing hitch 24 includes a gooseneck socket 26. Gooseneck socket 26 is disposed in opening 20 in cargo bed 12. Gooseneck socket 26 is configured for receiving a removable gooseneck towing ball 28 (FIG. 5). Towing ball 28 may include an opening 30 therein. A locking rod 32 (FIG. 4) may be used to lock towing ball 28 in place in socket 26, in a known manner. Some gooseneck towing balls may include locking detents that enable removal of the towing ball from socket 26 by pulling the towing ball vertically upward out of socket 26. Towing balls with locking detents need not include opening 30.

Gooseneck towing hitch 24 and towing ball 28 may be used with vehicle 10 to tow trailers in a known manner. When not towing, towing ball 28 may be removed and inserted in an upside down configuration in socket 26 to provide a smooth surface in cargo bed 12. When firing a mortar from vehicle 10, towing ball 28 is removed from gooseneck socket 26 and a removable mortar mount adapter 40 (FIG. 7A) is inserted in gooseneck socket 26.

Figure 6:
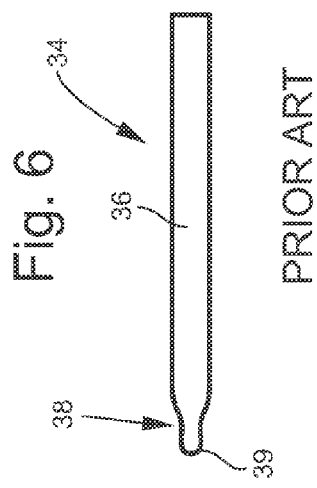
FIG. 6 is a schematic side view of a mortar tube.

FIG. 6 is a side view of a known mortar tube 34 having a barrel 36 and a breech end 38 with a spherical ball 39. When fired from the ground, mortar tubes are set in baseplates that have spherically-shaped sockets for receiving ball 39.

FIG. 7A is a top view of one embodiment of a removable mortar mount adapter 40. FIG. 7B is a side view of adapter 40 and FIG. 7C is a sectional view of adapter 40. Adapter 40 may be cast, injected molded, machined, or made with an additive manufacturing process. Adapter 40 may be made from, for example, steel. Adapter 40 may be a monolithic member having a longitudinal axis A. Adapter 40 has a socket 42 formed in one end for receiving ball 39 of mortar tube 34. Socket 42 may be symmetric about axis A. Socket 42 may be formed in various configurations. In one exemplary configuration shown in FIG. 7C, socket 42 includes a counterbore 44 and a spherical surface 46. A retaining clip groove may be formed in the wall of counterbore 44. After ball 39 is inserted in socket 42, a known mortar cap may be placed over ball 39 and fixed with a retaining clip.

Socket 42 may be used with a quick release retaining system that enables mortar tube 34 to be quickly disconnected from socket 42. One example of a quick release retaining system is described in U.S. Pat. No. 8,277,141 issued on Oct. 2, 2012 to Labar et al. and entitled "Ball and Socket Joint for Indirect Fire Weapon."

Adapter 40 includes a shank 48 centered on axis A. Depending on the shape of gooseneck socket 26, the exterior surface of shank 48 may be, for example, cylindrical or prismatic. Shank 48 may include a friction-reducing coating, such as TEFLON®, or grease may be applied to shank 48. Shank 48 may include a transverse through hole 50 with a central axis that is normal to longitudinal axis A. When adapter 40 is inserted in gooseneck socket 26, locking rod 32 (FIG. 4) may be inserted in transverse through hole 50 to secure adapter 40 in socket 26. A second transverse through hole (not shown) may be formed ninety degrees from through hole 50, for ease of securing adapter 40 in socket 26.

A longitudinal through hole 52 centered on axis A may be formed in adapter 40. Through hole 52 enables debris to collect or migrate away from contact surfaces in socket 42. The movement of debris from contact surfaces in socket 42 helps prevent ball 39 from seizing in socket 42.

Figure 8:
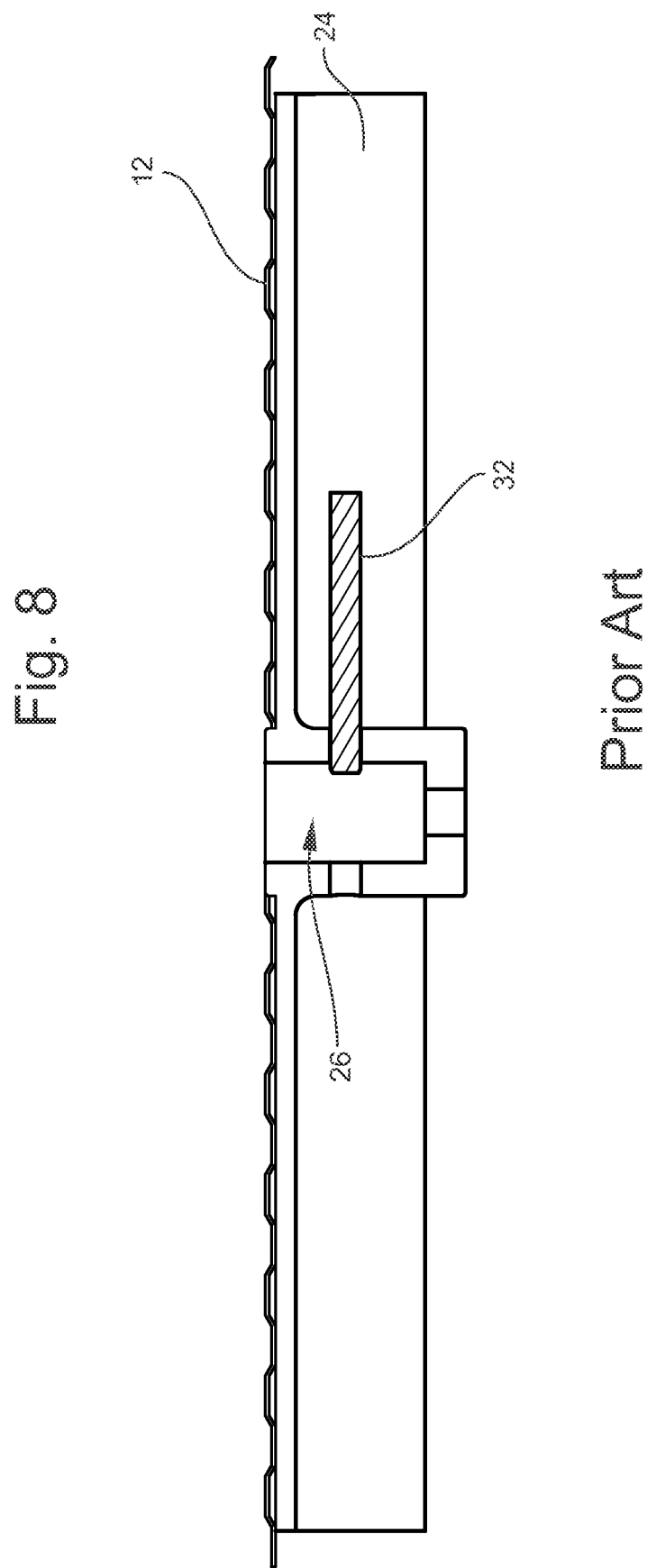
FIG. 8 is a partial transverse sectional view through a cargo bed with a gooseneck towing hitch.

FIG. 8 is a partial transverse sectional view through cargo bed 12 showing gooseneck towing hitch 24 with gooseneck socket 26 and locking rod 32. FIG. 9 is a view similar to FIG. 8 with adapter 40 disposed in gooseneck socket 26 and locking rod 32 inserted in transverse through hole 50. As an alternative to one or more transverse through holes 50, shank 48 may include detents (not shown) similar to those used with some gooseneck balls. The detents enable removal of adapter 40 by pulling vertically upward out of gooseneck socket 26.

FIG. 10 is a transverse sectional view showing variations of adapter 40. As another alternative to transverse through hole(s) 50, shank 48 may include a reduced thickness portion 54 centered on axis A. Reduced thickness portion 54 creates a circumferential slot or gap 56. Locking rod 32 or a similar locking rod may be inserted in gap 56 to limit axial movement of adapter 40 in gooseneck socket 26, while enabling 360 degree rotation of adapter 40 in gooseneck socket 26. The axial extent of gap 56 may be just large enough to receive locking rod 32. Or, in some embodiments, the axial extent of gap 56 may be larger than locking rod 32 to enable adapter 40 to telescope upward in gooseneck socket 26. It may be desirable to telescope adapter 40 upward, for example, to fire a mortar or other weapon horizontally (direct fire).

FIG. 10 also shows a variation in the structure of socket 42. Socket 42 in FIG. 10 includes a tapered or conical surface 47 adjacent a spherical surface 49.

Axial movement of adapter 40 in gooseneck socket 26 enables the use of springs and/or dampers to absorb recoil. Some examples of springs are compression springs and Belleville springs. Dampers may be rubber, gas, or hydraulic, for example. FIG. 11 is a transverse sectional view of adapter 40 having an opening 58 formed in one end. A spring 60 and a damper 62 may be disposed in parallel in opening 58. Spring 60 and damper 62 may also be arranged in series in opening 58. In addition or as an alternative to spring 60 and damper 62, an external spring 61 may be placed between a bottom surface of shank 48 and a bottom surface of socket 26. A fastener 70 may be fixed internally in shank 48, for example, with threads. Fastener 70 may reciprocate in an opening 71 in gooseneck socket 26.

Figure 12B:
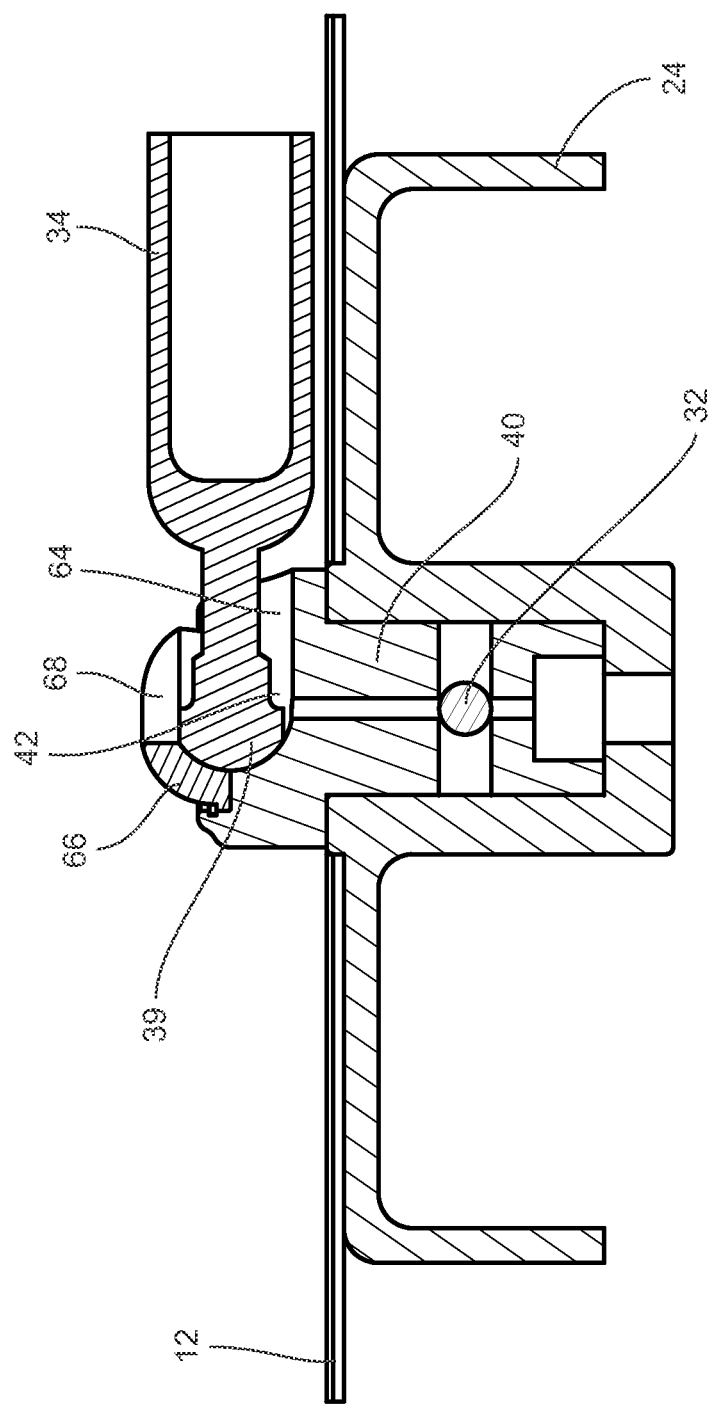
FIG. 12B is a longitudinal sectional view taken perpendicular to FIG. 12A

When firing the mortar horizontally (direct fire), adapter 40 may be modified to enable mortar tube 34 to rotate into a horizontal position. FIG. 12A is a transverse sectional view of adapter 40 with ball 39 of a horizontal mortar tube 34 in socket 42. FIG. 12B is a longitudinal sectional view taken perpendicular to FIG. 12A. As best seen in FIG. 12B, a portion of adapter 40 adjacent to socket 42 is removed to accommodate the horizontal position of tube 34. Removing a portion of adapter 40 creates a lateral opening 64 in which mortar tube 34 may be horizontally disposed. To secure the mortar horizontally, a dome-shaped cap 66 with an opening 68 therein may be placed over ball 39 and secured in socket 42 using, for example, a retaining clip or ring.

Other weapons may be used with adapter 40 by inserting a suitable pintle adapter 74 (FIG. 13) into socket 42 and mounting the direct fire weapon to the pintle adapter. Some exemplary weapons that may be used with adapter 40 and pintle adapter 74 are machine guns, grenade launchers, and recoilless rifles.

In another embodiment of the invention, vehicle 10 may include a trailer hitch receiver, also known as a "bumper pull" hitch. A trailer hitch receiver is fixed to frame 14 of vehicle 10 in a known manner, either at the rear or the front. The receiver generally includes square tubing that is oriented horizontally with respect to vehicle 10. Various embodiments of adapter 40 may be disposed in the trailer hitch receiver to enable firing of mortar tube 34 and other weapons.

Figure 14:
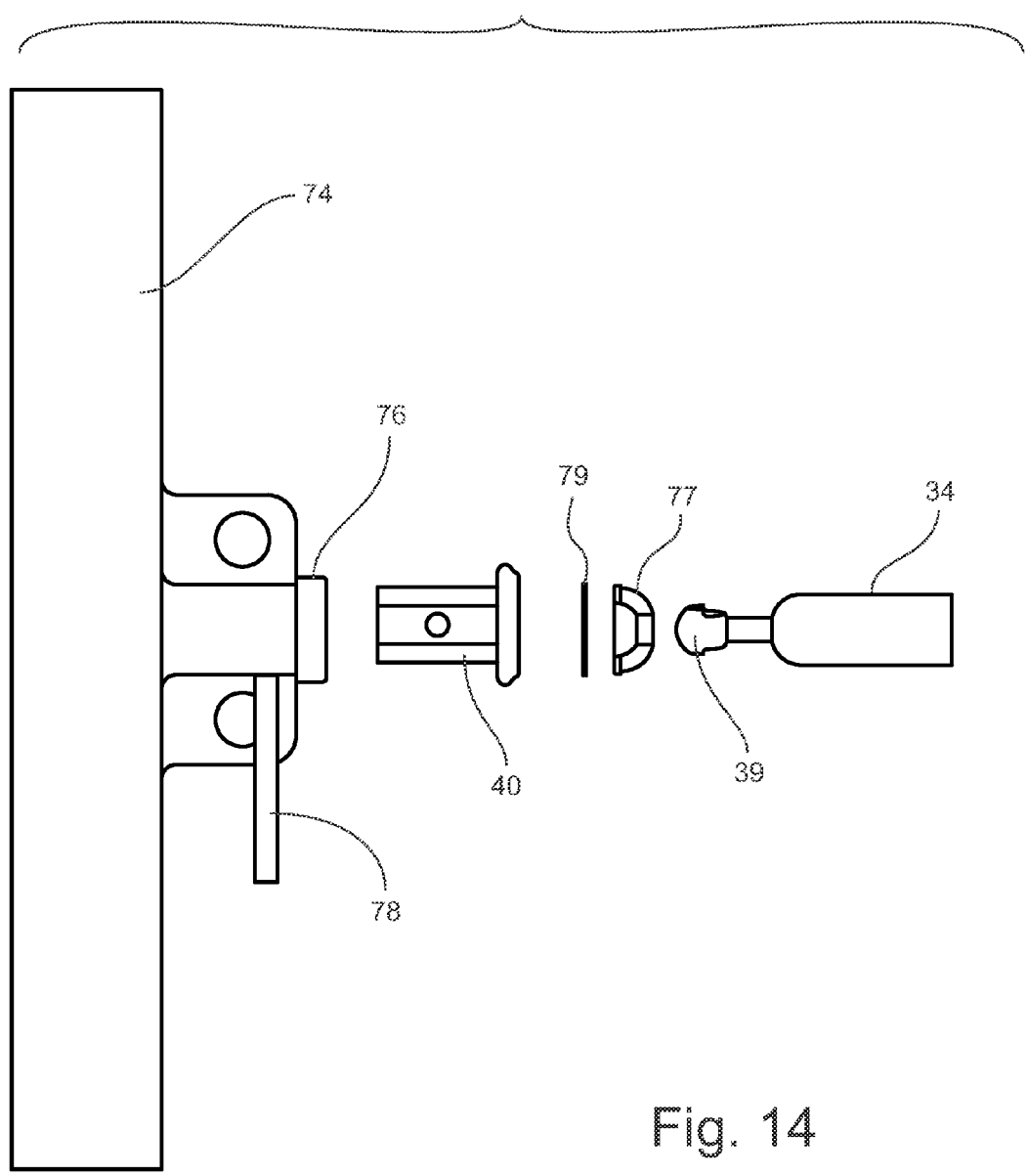
FIG. 14 is a top exploded view of a trailer hitch receiver with the adapter of FIGS. 7A-C, a mortar tube, and a mortar cap.

FIG. 14 is a top view of a trailer hitch receiver 72 with a square tubing 76. Adapter 40, for example, as shown in FIGS. 7A-C, may be inserted in tubing 76 and secured with a locking rod 78. Ball 39 of mortar tube 34 is inserted in the socket 42 of adapter 40 and a mortar cap 77 is secured around ball 39 with a retaining clip 79. In another embodiment shown in FIGS. 15A-C, adapter 40 as shown in FIGS. 12A and 12B may be disposed in tubing 76.

Figure 16A:
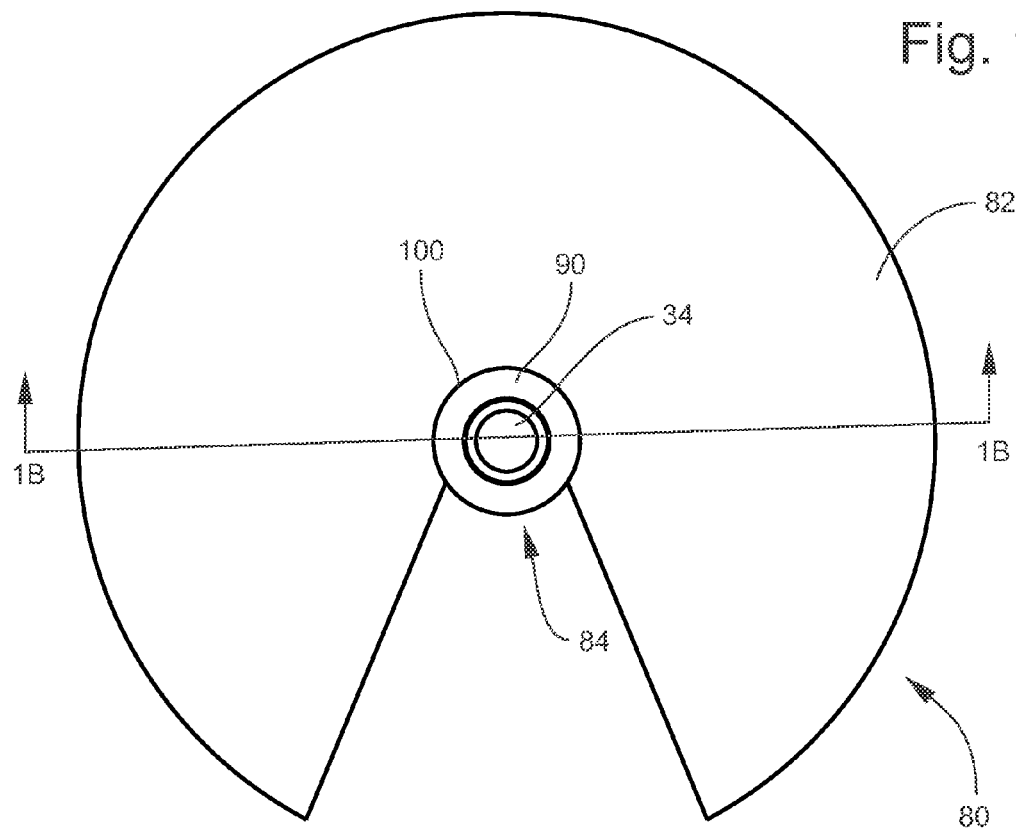
FIG. 16A is a schematic top view of a fifth wheel hitch system with a mortar mount adapter and mortar tube disposed therein.
Figure 16B:
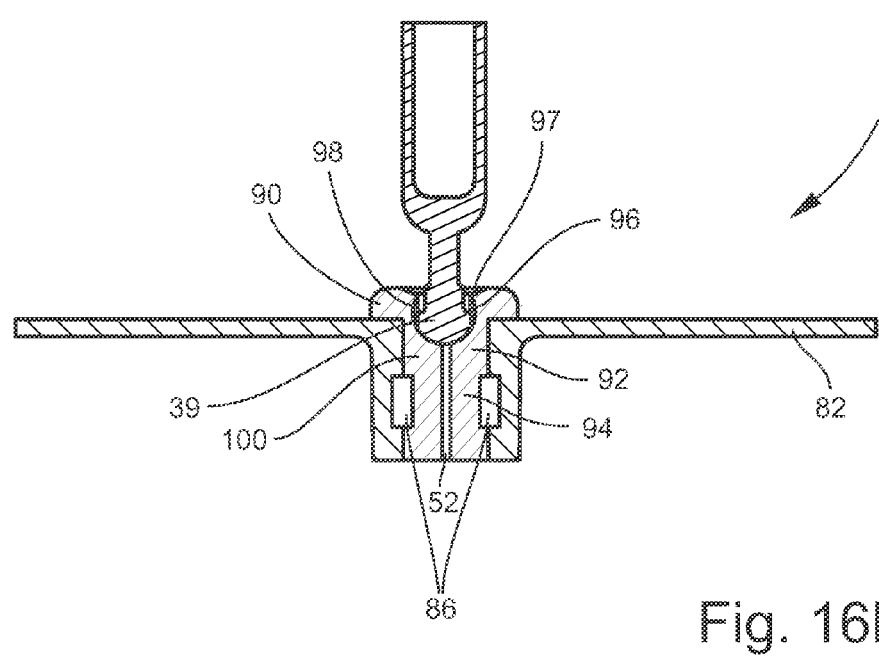
FIG. 16B is a sectional view taken along the line 16B-16B of FIG. 16A.

In another embodiment of the invention, a fifth wheel towing hitch system may be mounted on vehicle 10, for example, on cargo bed 12. The apparatus and methods for mounting fifth wheel towing hitch systems on cargo beds are well known. FIG. 16A is a schematic top view of a fifth wheel hitch system 80 having a horse shoe shaped plate 82. FIG. 16B is a sectional view taken along the line 16B-16B of FIG. 16A. A mortar mount adapter 100 is disposed in the king pin opening 84. Ball 39 of mortar tube 34 is disposed in a socket 96 of mortar mount adapter 100.

The exterior configuration of adapter 100 is the same or substantially the same as the exterior configuration of a standard king pin. The upper end of adapter 100 includes a flanged portion 90 having an outer diameter that is greater than the king pin opening 84. A socket 96 for receiving ball 39 is formed in the upper end of adapter 100. The shank 92 includes a reduced thickness portion 94. The securing mechanism of the fifth wheel system, such as jaws 86, engage reduced thickness portion 94 of shank 92 to secure mortar mount adapter 100 in hitch system 80. Mortar mount adapter 100 may rotate in king pin opening 84.

A longitudinal through hole 52 (FIG. 16B) may be formed in adapter 100 to enable debris to collect or migrate away from contact surfaces in socket 96. Socket 96 may include a tapered or conical surface 97 adjacent a spherical surface 98. Socket 96 may have other geometric configurations. For example, socket 96 may have the configuration of socket 42 shown in FIGS. 7A-C or of socket 42 shown in FIGS. 12A-B. Adapter 100 may also be used in gooseneck socket 26.

While the invention has been described with reference to certain embodiments, numerous changes, alterations and modifications to the described embodiments are possible without departing from the spirit and scope of the invention as defined in the appended claims, and equivalents thereof.

What is claimed is:

1. An apparatus, comprising:
   a mortar mount adapter configured to fit in one of a trailer hitch receiver;
   a gooseneck hitch socket; and
   a king pin opening in a fifth wheel hitch;
   the adapter having a central longitudinal axis and including a socket for a ball and socket joint in one end and a shank extending from the socket;
   wherein the socket and the shank are symmetrical about the longitudinal axis; and
   the socket is configured to receive a ball on a breech end of a mortar tube; and
   a longitudinal through hole extends from a bottom of the socket to an end of the shank, wherein the longitudinal through hole is centered around the longitudinal axis.

2. The apparatus of claim 1, wherein the shank includes a reduced thickness portion that forms an exterior slot.

3. The apparatus of claim 2, wherein an end of the shank includes an opening formed therein, the apparatus further comprising a spring disposed in the opening in the end of the shank.

4. The apparatus of claim 3, further comprising a damper disposed in the opening in the end of the shank.

5. The apparatus of claim 2, wherein a portion of the socket is cut away to form a lateral opening therein.

6. The apparatus of claim 2, wherein the socket end of the adapter includes a flange centered on the longitudinal axis.

7. The apparatus of claim 1, further comprising a land vehicle having a main frame and a gooseneck towing hitch system fixed to the main frame wherein the adapter is disposed in a gooseneck socket of the gooseneck towing hitch system.

8. The apparatus of claim 1, further comprising a land vehicle having a main frame and a fifth wheel towing hitch system fixed to the main frame wherein the adapter is disposed in a king pin opening in the fifth wheel towing hitch system.

9. The apparatus of claim 7, wherein the shank of the adapter includes a transverse through hole normal to the longitudinal axis and a locking rod of the gooseneck towing hitch system is disposed in the transverse through hole.

10. The apparatus of claim 1, wherein the socket includes a conical surface and a spherical surface.

11. A method, comprising:
   providing the apparatus of claim 1;
   wherein a portion of the socket joint is cut away to form a lateral opening therein; and
   inserting the adapter into one of the trailer hitch receiver, the gooseneck hitch socket, and the king pin opening;
   inserting a ball of a breech of a mortar tube into the socket in the adapter;
   the method further comprising firing a round from the mortar tube in a direct fire manner.

12. The method of claim 11, further comprising firing a round from the mortar tube.

13. The method of claim 11, further comprising inserting a pintle adapter into the mortar mount adapter.

* * * * *